United States Patent [19]
Bugaut et al.

[11] 3,817,995
[45] June 18, 1974

[54] HYDROXY 3,4-DINYDRO-2H-1,4-BENZOXAZINES AND BENZTHIAZINES

[75] Inventors: Andree Bugaut, Boulogne sur Seine; Francoise Estradier, Paris, both of France

[73] Assignee: Societe anonyme dite: L'Oreal, Paris, France

[22] Filed: May 17, 1972

[21] Appl. No.: 254,171

Related U.S. Application Data

[62] Division of Ser. No. 847,413, Aug. 4, 1969, Pat. No. 3,690,810.

[52] U.S. Cl. ..... 260/244 R, 260/243 R, 260/471 C, 8/10
[51] Int. Cl. .................................. C07d 87/32
[58] Field of Search ............................ 260/243, 244

[56] References Cited
OTHER PUBLICATIONS

Hill et al., J. Chem. Soc., (London)(p. 3,709–3,713) (1964).

*Primary Examiner*—Harry I. Moatz
*Attorney, Agent, or Firm*—Cushman, Darby & Cushman

[57] ABSTRACT

Oxidation dye coupling compounds for use in dyeing live human hair having the formula:

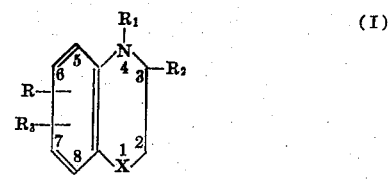

3 Claims, No Drawings

HYDROXY 3,4-DINYDRO-2H-1,4-BENZOXAZINES AND BENZTHIAZINES

This is a division of application Ser. No. 847,413 filed Aug. 4, 1969, now U.S. Pat. No. 3,690,810.

SUMMARY OF THE INVENTION

There are methods of dyeing keratinic fibers, and particularly human hair, in which the hair is dyed by means of compositions containing oxidation dyes, and in particular by means of aromatic ortho or para diamines and ortho or para aminophenols, which are generally referred to as "oxidation bases". It is also conventional to vary the shades obtained with these bases by utilizing color modifiers or "couplers" and, in particular, aromatic meta diamines and meta aminophenols.

The present invention relates to a new class of couplers which may be used with known oxidation dyes. It is the object of the invention to provide as a new article of manufacture a dye for keratinic fibers, and particularly for human hair, which is essentially characterized by the fact that it contains, in association with at least one conventional oxidation base, at least one benzomorpholine compound having the general formula:

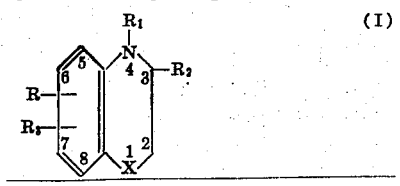

(I)

in which X represents sulfur or oxygen, R represents hydroxyl or an amino group in position 8 or 6, $R_1$ and $R_2$ represent hydrogen, lower alkyl having 1–4 carbon atoms or a lower hydroxy alkyl having 1–4 carbon atoms, and $R_3$ is H or lower alkyl having 1 to 4 carbon atoms. These compounds may be used in the form of their mineral or organic acid addition salts. Among the bases which may be advantageously used in association with the couplers of formula I are: paraphenylenediamine, paratolylene-diamine, paraaminophenol, N-methyl-para-aminophenol, chloro-paraphenylenediamine, methoxy-para-phenylene-diamine, 6-methoxy-3-methyl-para-phenylene-diamine, (N-ethyl, N-carbamyl-ethyl) para-phenylene-diamine, 2,5-diamino-pyridine.

Among the couplers responding to formula (I) are: 6-hydroxy-benzomorpholine, 6-amino-benzomorpholine, 8-hydroxy-benzomorpholine, 8-amino-benzomorpholine, 4-methyl-6-hydroxy-benzomorpholine, 3-methyl-6-hydroxy-benzomorpholine, 8-hydroxy-6-methyl-benzomorpholine.

The ratio of base to coupler in the dyeing compositions according to the invention may vary within broad limits, but an excess of coupler is preferably used.

The dyeing compositions of this invention may contain other dyes suitable for use under the same conditions, including direct dyes (such as azo or anthraquinone dyes), or dyes obtained by the association of bases and couplers other than those constituting the subject matter of the present invention.

The compositions of this invention may also contain wetting agents, dispersing agents, penetrating agents, or any other ingredients conventionally used in dyeing hair. They may take the form of an aqueous solution, a cream, a gel or an aerosol.

The compositions according to the invention are used in a conventional manner at an alkaline pH, preferably between 8 and 10. This pH may be obtained, for example, by adding ammonia or some other base. The composition is applied to the hair in the presence of an oxidizing solution, which is preferably a solution of hydrogen peroxide.

It is a further object of the present invention to provide a method of dyeing hair which is characterized by making the dye composition defined above alkaline, adding hydrogen peroxide thereto and applying the mixture to the hair. The hair is then rinsed, shampooed and dried.

A further object of the invention is to provide new compounds having the formula I in which R represents a hydroxyl radical, that is to say those compounds having the formula:

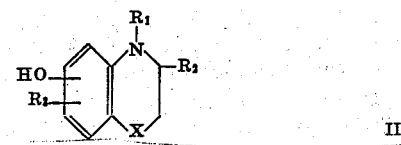

II in which the OH radical is in position 8 or 6. These compounds may be prepared from 2,3-dimethoxy or 2,5-dimethoxy aniline, by condensation with glycol bromhydrin followed by cyclization with hydrobromic acid. This method has been described in the prior art literature for use in preparing benzomorpholine.

It is a further object of the present invention to provide a new method of preparing compounds of formula I in which R represents an amino constituent, that is to say those compounds having the formula:

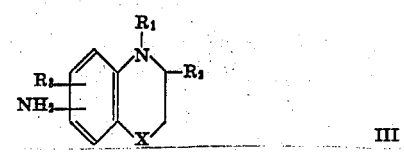

III in which the amino group is in position 8 or 6. In this process chloroethyl chloroformiate is condensed in a first step with a 2-methoxy-5-nitro aniline or with a 2-methoxy-3- nitro aniline in order to obtain the corresponding chloroethyl carbamate. This is cyclized with a strong mineral base such as sodium hydroxide or potassium hydroxide. Then the nitro group of the resulting compound is reduced with a reducing agent, such as iron in an aqueous acetic acid medium.

The following examples illustrate the different forms of the invention. In these examples, which are purely illustrative, the percentages are given by weight and the temperatures are indicated in degrees Celsius, that is to say degrees Centigrade.

EXAMPLES OF PREPARATION

EXAMPLE 1

Preparation of 6-hydroxy benzomorpholine

This process may be schematically described as follows:

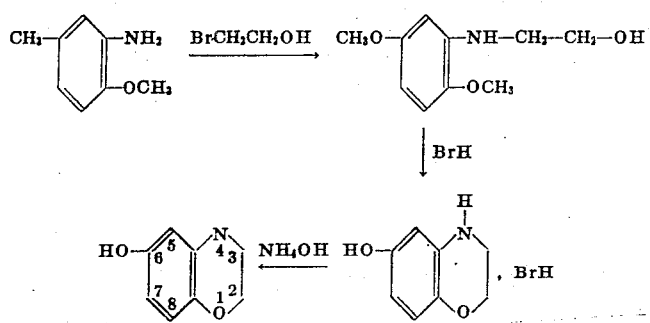

1-/Preparation of 2,5-dimethoxy-N-(β-hydroxyethyl) aniline

A mixture containing 100 g (0.654 mole) of 2,5-dimethoxy aniline, 147.5 g (0.825 mole) of 70 percent glycol bromohydrin, 45 g (0.45 mole) of calcium carbonate and 500 cm³ of water are heated at reflux for 4 hours. After cooling and filtering the reaction mixture, it is extracted using ethyl acetate. The solvent is eliminated under vacuum and the oily residue is fractionally distilled. The yield is 62 g of 2,5-dimethoxy, N-(β-hydroxyethyl) aniline, boiling point at 0.05 mm = 137°–142°, melting point = 48.5°, which analyzes as follows:

| ANALYSIS | CALCULATED FOR $C_{10}H_{15}NO_3$ | FOUND |
|---|---|---|
| C % | 60.91 | 60.81 |
| H % | 7.61 | 7.63 |
| N % | 7.10 | 7.01 |

2-/Preparation of 6-hydroxy benzomorpholine 8 g (0.04 mole) of 2,5 dimethoxy N-(β-hydroxyethyl) aniline are heated at reflux for 2 hours in 40 cm³ of hydrobromic acid having a density of 1.78. After cooling the reaction mixture, 6 g of 6-hydroxy benzomorpholine hydrobromide is separated out by drying. This hydrobromide is dissolved in water and the aqueous solution is neutralized with ammonia. Drying then yields 3.5 g of 6-hydroxy benzomorpholine which, after recrystallization in toluene, melts at 115°.

| Analysis | Calculated for $C_8H_9NO_2$ | Found |
|---|---|---|
| C % | 63.57 | 63.51 |
| H % | 5.96 | 6.02 |
| N % | 9.27 | 9.44 |

EXAMPLE 2

Preparation of 6-amino benzomorpholine

This process may be schematically represented as follows:

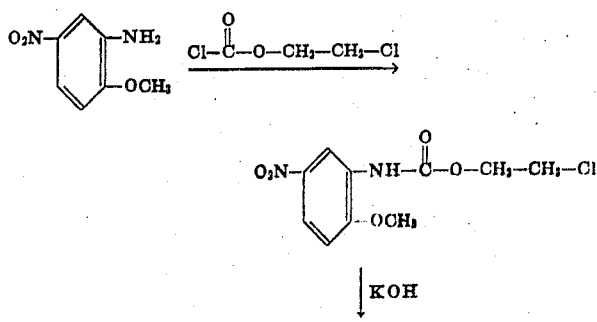

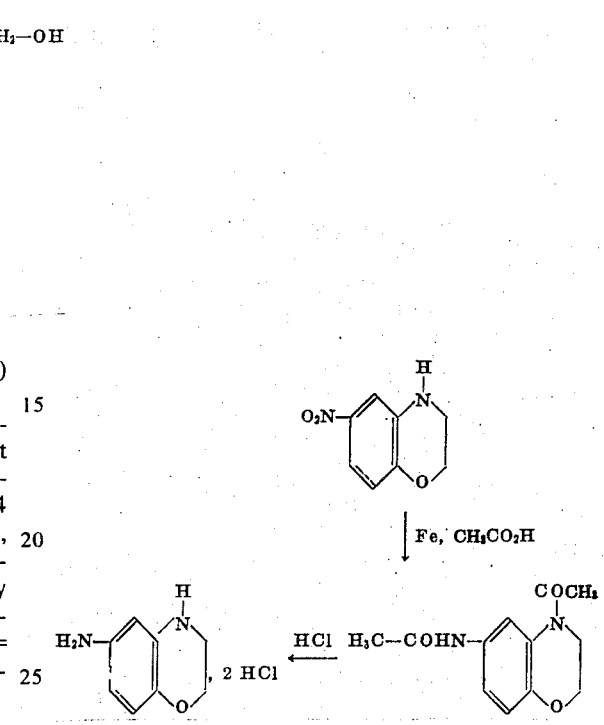

1-/Preparation of β-chloroethyl N-[(2-methoxy-5-nitro) phenyl] carbamate 63.g (0.37 mole) of 2-amino-4-nitro anisole is dissolved in 190 cm³ of dioxane. 26 g (0.26 mole) of calcium carbonate is then added. The mixture is brought to reflux and 63 g (0.44 mole) of β-chloroethyl chloroformiate is added little by little. After heating for an hour the boiling liquid is filtered. The filtrate is cooled, and drying yields 90 g of β-chloroethyl N-[(2-methoxy-5-nitro) phenyl] carbamate which, after recrystallization in diozane, melts at 130°.

2-/Preparation of 6-nitro-benzomorpholine 68.6 g (0.25 mole) β-chlorethyl N-[(2-methoxy-5-nitro) phenyl] carbamate is added to 600 cm³ of ethyl alcohol at 95° containing 66 g of 85 percent potassium hydroxide. This is heated at reflux for 2 hours under a nitrogen atmosphere. After cooling, the reaction mixture is diluted with 2 liters of ice water and drying yields 43 g of 6-nitro benzomorpholine which, after recrystallization in benzene, melts at 120°.

| Analysis | Calculated for $C_8H_8O_3N_2$ | Found | |
|---|---|---|---|
| C % | 53.30 | 53.51 | 53.40 |
| H % | 4.44 | 4.48 | 4.60 |
| N % | 15.55 | 15.49 | 15.54 |

3-/Preparation of 4-acetyl-6-acetylamino benzomorpholine 7 g (0.039 mole) of 6-nitro benzomorpholine is introduced into 40 cm³ of water containing 1.5 cm³ of acetic acid and 8.8 g of iron powder. The reaction mixture is brought to 80° for 20 minutes and neutralized with sodium carbonate. It is boiled dry and the filtrate introduced directly into 15 cm³ of acetic anhydride. After cooling, drying yields 6.5 g of 4-acetyl-6-acetylamino benzomorpholine which, after recrystallization in alcohol, melts at 198°.

| Analysis | Calculated for $C_{12}H_{14}N_2O_3$ | Found | |
|---|---|---|---|
| C % | 61.53 | 61.93 | 61.91 |
| H % | 5.98 | 6.22 | 6.22 |
| N % | 11.96 | 11.91 | 11.92 |

4-/Preparation of 6-amino benzomorpholine dihydrochloride 3 g (0.0138 mole) of 4-acetyl-6-acetylamino benzomorpholine is introduced into 9 cm³ of concentrated hydrochloric acid, and the reaction mixture is brought to reflux for 2 hours. After cooling to −10°, drying yields 2.3 g of 6-amino benzomorpholine dihydrochloride which melts and decompose at 235°–240°.
Calculated molecular weight for $C_8H_{12}N_2OCl_2$ : 223
Molecular weight found by potentiometric measurement : 233

EXEMPLES OF APPLICATION

EXAMPLE 3

The following dyeing solution is prepared:

| | |
|---|---|
| para-toluylenediamine | 1 g |
| 6-amino benzomorpholine dihydrochloride | 0.8 g |
| 20% ammonium lauryl sulfate, that is to say aqueous ammonium lauryl sulfate solution, the concentration of which is 20% as referred to lauryl alcohol | 200 g |
| ethylene diamino tetra acetic acid | 3 g |
| 20% ammonia | 100 g |
| 40% sodium bisulfite | 10 g |
| water q.s.p. | 1000 g |

This solution, when mixed with an equal weight of 6 percent hydrogen peroxide and applied for 30 minutes to 100 percent white hair, produces a purplish-blue.

EXAMPLE 4

The following dyeing solution is prepared:

| | |
|---|---|
| para-toluylene diamine | 3 g |
| 6-methyl-3-methoxy paraphenylene diamine dihydrochloride | 5 g |
| 6-hydroxy benzomorpholine | 5 g |
| meta diamino anisole sulfate | 4 g |
| 4-(γ-aminopropyl)-amino 1-methylamino anthraquinone | 0.5 g |
| 20% ammonium lauryl sulfate | 200 g |
| ethylene diamino tetra-acetic acid | 3 g |
| 20% ammonia | 100 g |
| 40% sodium bisulfite | 10 g |
| water q.s.p. | 1000 g |

This solution, when mixed with an equal weight of 6 percent hydrogen peroxide and applied for 30 minutes to 100 percent white hair, produces a deep green.

EXAMPLE 5

The following dyeing solution is prepared:

| | |
|---|---|
| 2,5 diamino 4-methyl anisole dihydrochloride | 1 g |
| 6-hydroxy benzomorpholine | 0.7 g |
| 20% ammonium lauryl sulfate | 20 g |
| ethylene diamino tetra-acetic acid | 0.3 g |
| 20% ammonia | 10 g |
| 40% sodium bisulfite | 1 g |
| water q.s.p. | 100 g |

This solution, when mixed with an equal weight of 6 percent hydrogen peroxide and applied for 30 minutes to 100 percent white hair, produces a greenish brown.

EXAMPLE 6

The following dyeing solution is prepared:

| | |
|---|---|
| 2,5-diamino 4,6-dimethyl anisole dihydrochloride | 1 g |
| 6-hydroxy benzomorpholine | 1.1 g |
| 20% ammonium lauryl sulfate | 20 g |
| ethylene diamino tetra-acetic acid | 0.3 g |
| 20% ammonia | 10 g |
| 40% sodium bisulfite | 1 g |
| water q.s.p. | 100 g |

This solution, when mixed with an equal weight of 6 percent hydrogen peroxide and applied for 30 minutes to 100 percent white hair, produces a bright gray with green glints.

EXAMPLE 7

The following dyeing solution is prepared:

| | |
|---|---|
| paratoluylene diamine | 1 g |
| resorcinol | 0.1 g |
| 2,5-diamino 4-methyl anisole dihydrochloride | 0.2 g |
| 6-hydroxy benzomorpholine | 1.3 g |
| 20% ammonium lauryl sulfate | 20 g |
| ethylene diamino tetra-acetic acid | 0.3 g |
| 20% ammonia | 10 g |
| 40% sodium bisulfite | 1 g |
| water q.s.p. | 100 g |

This solution, when mixed with an equal weight of 6 percent hydrogen peroxide, and applied for 30 minutes to 100 percent white hair, produces a greenish brown which is very stable under exposure to light.

Other illustrative coupling compounds of this invention are:

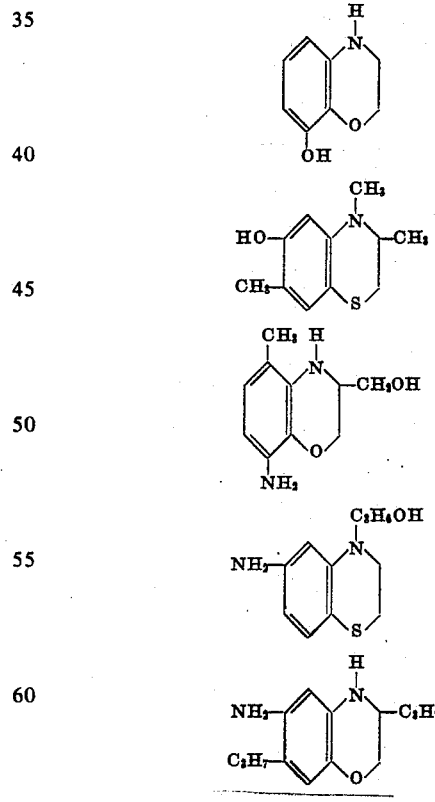

and the organic and numeral acid salts of the above compounds.

The preferred organic acid salts are the salts of acetic acid, formic acid, proprionic acid, etc.

The preferred mineral acid salts are salts of the halogen acids, such as hydrochloric acid, hydrobromic acid, or of sulfuric acid, phosphoric acid, etc.

The preferred hair dye compositions may contain 0.1 to 10 percent of the coupler compound and 0.1 to 10 percent of the oxidation base dye.

The oxidation dye - coupler compositions of this invention may be placed in any suitable carrier such as water, alcohol, etc. and they may be in any suitable form such as solution, gel, cream, aerosol, etc. Suitable carriers, gelling agents, aerosol compositions, etc. are set forth in many text books, such as Cosmetic Compositions Volume I and II by Harry.

What is claimed is:

1. A compound having the formula:

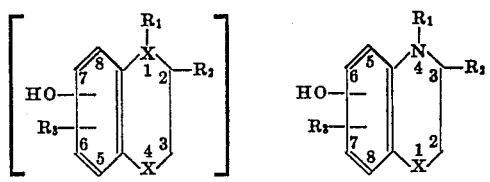

in which the OH radical is in position 8 or 6, X is selected from the group consisting of sulfur and oxygen, $R_1$ and $R_2$ are selected from the group consisting of hydrogen, lower alkyl and lower hydroxy alkyl, and $R_3$ is selected from the group consisting of H and lower alkyl.

2. A compound of claim 1 selected from the group consisting of 6-hydroxy benzomorpholine, 8-hydroxy benzomorpholine, 4-methyl-6-hydroxy benzomorpholine, 3-methyl-6-hydroxy benzomorpholine and 8-hydroxy-6-methyl benzomorpholine.

3. A method for preparing a compound having the formula

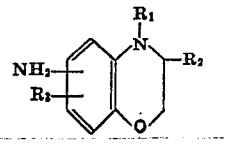

wherein the $NH_2$ group is in position 8 or 6, $R_1$ and $R_2$ are selected from the group consisting of hydrogen, lower alkyl and lower hydroxy alkyl, and $R_3$ is selected from the group consisting of hydrogen and lower alkyl, comprising heating chloroethyl chloroformiate with a member selected from the group consisting of 2-methoxy-5-nitro aniline and 2-methoxy-3-nitro aniline at reflux to produce a corresponding chloroethyl carbamate, cyclizing said resulting chloroethyl carbamate by heating the same to reflux in the presence of a strong mineral base selected from the group consisting of sodium hydroxide and potassium hydroxide thereby producing a corresponding nitrobenzomorpholine and reducing the nitro group of said resulting nitrobenzomorpholine to an amino group in the presence of iron in an aqueous acetic acid medium.

* * * * *

UNITED STATES PATENT OFFICE
CERTIFICATE OF CORRECTION

Patent No. 3,817,995   Dated June 18, 1974

Inventor(s) Andree Bugaut and Francoise Estradier

It is certified that error appears in the above-identified patent and that said Letters Patent are hereby corrected as shown below:

In the Heading:

Please add the following: --

[30] Foreign Application Priority Data
        August 13, 1968, Luxembourg 56703 --

Signed and sealed this 19th day of November 1974.

(SEAL)
Attest:

McCOY M. GIBSON JR.   C. MARSHALL DANN
Attesting Officer   Commissioner of Patents